J. S. GALLAHER, Jr.
Water Cooler.

No. 14,498.

Patented March 25, 1856.

UNITED STATES PATENT OFFICE.

JOHN S. GALLAHER, JR., OF WASHINGTON, DISTRICT OF COLUMBIA.

WATER COOLER AND FILTERER.

Specification of Letters Patent No. 14,498, dated March 25, 1856.

*To all whom it may concern:*

Figure 1:
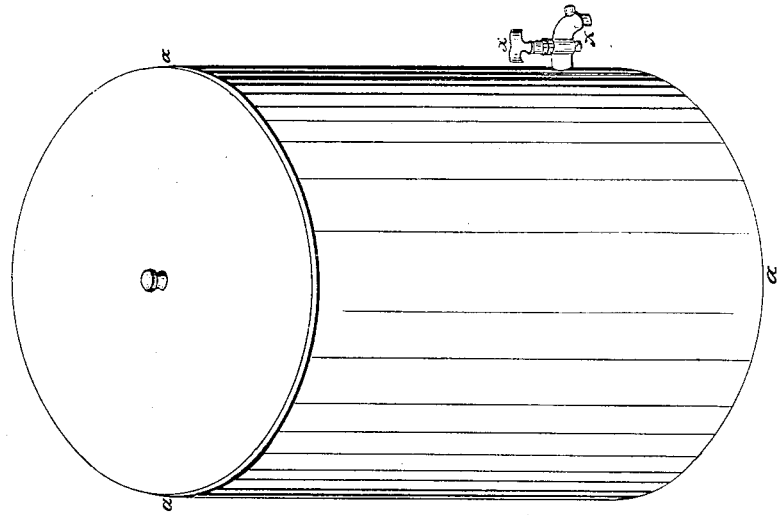

Be it known that I, JOHN S. GALLAHER, Jr., of Washington city, in the District of Columbia, have invented and made certain new and useful Improvements in Combination Filters and Coolers for Filtering and Cooling Water at one and the Same Time; and I do hereby declare that the following is a full, clear, and exact description of the same, reference being had to the accompanying drawings, making a part of this specification, Figure 1, showing the combination apparatus complete, $a\ a\ a$ being the shield or cap; $x\ x$, the stop-cock or water-egress; $y$, the knob or handle to cap.

Figure 2:
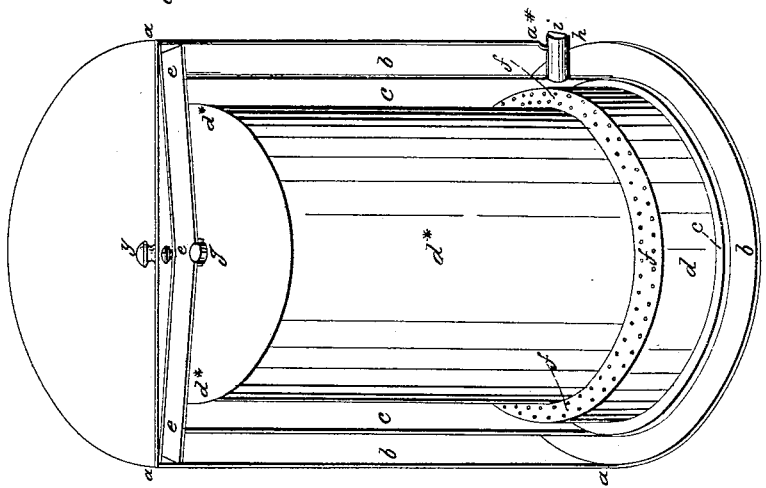

Fig. 2, is a sectional view vertically taken of the cap $a, a, a$, and casing or packing vessel $b, b$, the receiver $c, c, c$, the reservoir $d, d^*, d^*$ with the perforated offset $f, f, f$. the air box, or evaporating chamber, $g$, the throat, $h, i$, the escape tube.

Figure 3:
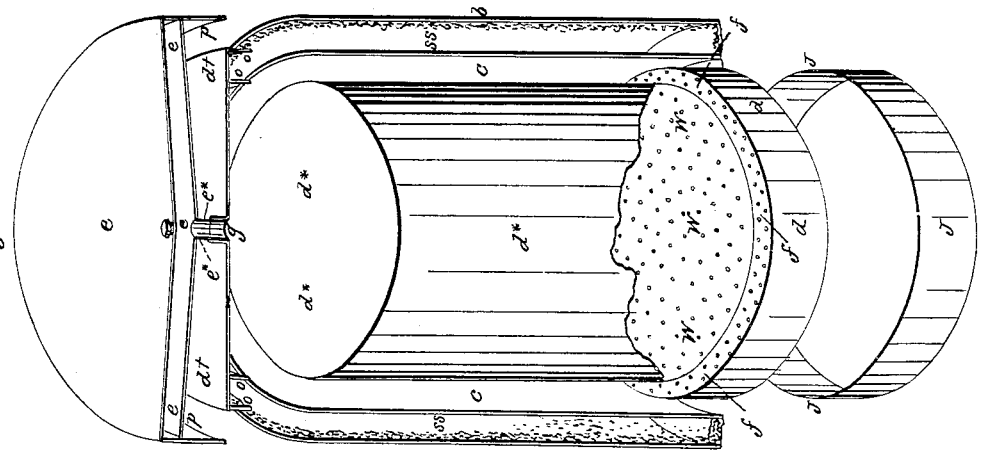

Fig. 3 is a sectional view, with parts detached; $b, b, b$, the casing; $c, c$, the receiver; $d, d, d$, the reservoir or water vessel, with perforated offset $f, f$, and showing a fragment broken out of circumference of water vessel disclosing the perforated bottom, $w, w, w, d^*, d^*$, is the cap or top, to receiver and reservoir, showing the throat $g$, and the two rims $o, o; e, e, e$ the concave air box, or evaporating chamber, with neck $e^*, e^*$, and extension rim $p, p;$ J, J, J, is the strainer saucer, or filtering dish.

*Description.*—My invention has for its object the double purpose of filtering and cooling water at one and the same time, and if desired, dispensing entirely with ice, the cooling of the water being produced by mechanical and chemical artificial evaporation. The filtering and cooling are brought about in the following manner. The nature and principles of my apparatus consist in constructing a vessel $b, b, b$, Figs. 2, 3 of wooden ware, or any other suitable material, of a square or circular form, of required dimensions with a perforation or hole through its side about two or three inches from the base or bottom, and large enough in diameter to admit of inserting a suitable tube and stop cock faucet, or spigot. This vessel is open at the top; another or second vessel $c, c, c$, Figs 2, 3, of stone or earthen ware is employed, about four inches smaller in diameter, and two inches shorter in length or depth having a pipe or outlet tube $h, i$, Fig. 2, into which is fitted the faucet or stop cock $x, x$, Fig. 1. This vessel or receiver is also open at top. Within the casing vessel $b, b, b, b$, is arranged the receiver $c, c, c, c$, and a compound mass of pulverized charcoal, and fine salt, and gypsum, is packed in closely, completely surrounding the bottom and side of the receiver $c, c, c, c$, or the packing may be first composed of a surrounding layer, or jacket of charcoal, an inch, more, or less thick; then a jacket of salt, and lastly a jacket of gypsum; each jacket or packing may be of same thickness, if desired, as shown in Fig. 3, $s, s, s, s, s, s$. This packing must be well pressed in, and may extend flush up, or level with the top edge of the casing $b, b$, and receiver $c, c$. Next is employed another stoneware or suitable vessel for a reservoir, formed as shown in Fig. 3, having a perforated, or strainer bottom $w, w, w$, with an offset two inches, more or less wide and having perforations also as at $f, f, f$. This offset may be in a horizontal line with the bottom of reservoir. This offset has a rim or flange base, from two to three inches deep, as shown at $d, d, d$, Figs. 2, 3, and extends downward from line of bottom. This reservoir $d^*, d^*$, from edge of rim below to top edge, is the same height of the receiver $c, c$, when placed therein. Next a strainer saucer or filtering dish is employed of the size of the inside diameter and depth of the reservoir rim $f, f, f$. This dish is then filled with alternate layers, or disks, of pulverized, or cut charcoal, and sand or gravel, or compound cakes or disks, of charcoal and gypsum, moistened and worked together, forming porous disks or layers. After filling the dish $j, j, j$, to within about half an inch, (or, more) take slips of sponge, or cotton wick, or cotton cloth or any capillary material, and pack, or lay on the top of sand or gravel, and between the perforations of the bottom and offset, sufficient of said capillary material to fill up the space. This being done, the reservoir $d^*\ d^*\ d^*$ is set over the filtering saucer $j, j, j$ Fig. 3, and the two fitting closely together are placed within the receiver $c, c, c$, Figs. 2, 3. This being done, next a cap or top $d^x, d^x$ with throat $g$, (of suitable side), and having two rims, $o, o$, answer as a cap or covering for the reservoir $d^*$, and receiver $c, c$. These rims $o, o, o, o$, should be made to fit close, to prevent leakage, and if necessary packing, may be used within, and around the rims. Next is constructed another vessel of tin, glass, porcelain, or of any suitable material, and of the diameter of the casing or packing vessel $b$, $b$. This vessel $e$, $e$, $e$, $e$, is formed with concavo-convex top and bottom, about 3 or 4 inches apart, and a rim or flanged side, all around and extending downward two or three inches as at $p$, $p$, Fig. 3. This vessel has a small button knob $r$, on its top surface. It will be observed that this vessel also has a short tubular neck to the bottom thereof, as at $e^*$, $e^*$. The vessel thus constructed, as shown by section, Fig. 3, presents the appearance of two inverted convex disks, with side rim or flange $p$, $p$. The neck of this vessel fits tight into the throat of the cap or cover $d^*$, $d^*$, as at $e^*$, $e^*$. The neck $e^x$, $e^x$ of the evaporating chamber or air box and the throat $g$, of the top of the reservoir, may both be enlarged even to the diameter of the reservoir, thereby enabling a more rapid ascendance and increased accumulation of vapor in the air chamber $e$, $e$, $e$. This concavo-convex vessel I term an air box, or evaporating chamber. The rim $p$, $p$, of this chamber fits over the outside of the casing or packing vessel $b$, $b$. Having these several vessels, constructed, the next and last thing to be constructed is a shield or cap, made of common sheet iron, tin, zinc, or any suitable material, without a bottom, but having a dished or raised top, with a knob or button handle, $k$ $j$, Figs. 1 and 2. This cap has a clip or slot in its surrounding surface $h$, $a$, Fig. 2, to admit of the cap or shield passing over the stop cock or spigot $x$, $x$, Fig. 1. It is important that this cap be not too large, but to fit neatly over the combined apparatus at Fig. 2.

Having described the mechanical construction of my improved apparatus, the filtering operation of the same is as follows. The vapor chamber or evaporating box, or vessel $e$, $e$, $e$, Figs. 2 and 3, is detached, and a supply of water is introduced into the reservoir $d^*$, $d^*$, $d^*$, through the throat $g$, of the covering $d^x$, $d^x$, Fig. 3, in any well known manner. A supply being furnished, the hydrostatic pressure of the water, forces down through, the sand, and charcoal, and escapes upward through the capillary packing of sponge, or cotton or other suitable fibrous or porous material, beneath the perforated offset and flowing out therefrom in a perfectly filtered and purified state, fills the space or chamber $c$, $c$, surrounding the reservoir, from which water chamber, the purified liquid may be drawn off through the tube, or pipe $h$, $i$, and stop cock $x$, $x$, Figs. 1, 2. And, as the supply of pure water diminishes replenish the reservoir by adding thereto. The cooling process, takes place as follows, viz, and by this arrangement of my apparatus, the use of ice may be entirely dispensed with if desired. The agents, charcoal, salt, and gypsum, in which the receiver C, C, and reservoir $d^*$, $d^*$, are embedded, by their non-conducting properties, tend naturally to reduce the original temperature of the water in the receiver; but the more readily to produce a complete result, in the increased reduction of temperature, a woolen, or felt cloth or fabric is saturated thoroughly with water of a natural temperature, and this cloth is placed on the top of, and may surround the evaporating chamber or air box $e$, $e$, $e$, $e$, when the cloth is to remain and the shield or cap $a$, $a$, $a$, Fig. 1, is then slipped over the whole combined apparatus, as exhibited in Fig. 1. The application of this saturated cloth to the top of the evaporating chamber, tends rapidly to reduce the temperature of the air therein, the consequence of which is the heated vapor or caloric of the water in the reservoir $d^*$, $d^*$, is thrown off rapidly, and is attracted into the air chamber, and being there concentrated is chilled, by the surface of the air chamber, is condensed in form of drops, and accumulates in quantities, and trickles down the convex top, and sides, and concave bottom, and is returned in a cooled condition into the reservoir, or receiver. By my combination apparatus, the reduction of the temperature of the water, does not so much ensue from the usual diffuse exhalation or evaporation, consequent upon the exposure to and contact of the surrounding common atmosphere, with the saturated cloth, as does the result depend on the keeping the rag or cushion, well saturated, in order to prevent the too rapid drying thereof when in immediate contact with the common atmosphere, avoiding which rapid drying, enables the continuing, and retaining the chilled air in the evaporating chamber $e$, $e$, $e$. In order therefore to attain this result, it is necessary to employ the shield or cap $a$, $a$, $a$, which however need not be placed over the apparatus until a partial exhalation has taken place. This evaporating action is kept up, regularly, and the heated or original vapor of the water ascends, and returns, and reascends, and returns, and thus by the combined action of the saturated cloth the evaporating chamber, and the refrigerative agents, charcoal, salt, and gypsum, a certain, and speedy result, comfort and economy in the use of cooled water may be attained, especially in those regions of climate where ice, and pure water are not naturally available.

The action of my combined apparatus in its cooling operation presents a principle, somewhat similar in its effects, to the action in hot weather, demonstrated by the accumulation and condensing of the common atmosphere, observed on the exterior of pitchers, glasses, or other receptacles of water, and this natural principle of reducing the atmosphere by evaporation, and condensation, I have availed myself of, and have invented a mechanical and artificial mode of inducing the more useful, and important result so much sought after.

Deeming it not necessary to enter more at length into the many advantages pertaining to my combination, filter and cooler, and having described the mechanical construction and the operation thereof and distinctly disclaiming originating, inventing, or discovering the principle of cooling water by the application solely of a saturated cloth, as heretofore employed, What I do claim, however, as an improvement, and as new and original with myself and desire to have secured by Letters Patent of the United States is as follows, viz.

1. I claim the application of combined chemical refrigerative agents, salt, charcoal, and gypsum, and a mechanical evaporating or air chamber $e, e, e$, formed with a convex, inverted, conical, sloping, or tapering cover or top, and a corresponding bottom part, combined in use with a saturated cloth, and through all of which means, the ascending diffuse vapor is condensed, accumulated and returned into its original volume, purified and cooled at one and the same time simultaneously, in the manner described.

2. I claim in combination with the condensing medium $e, e, e$, and chemical refrigerative agents, as described the purifying, or filtering devices $c, c, c, d, d, d, d^x, d^x, d^x, f, f, f$ J, J, J, W, W, with the capillary agents, and porous disks; through all of which, chemical action, and mechanical devices is produced a compact individual, or unity cooling and filtering apparatus substantially as set forth and for the purpose specified.

JOHN S. GALLAHER, Jr. [L. S.]

Witnesses.
J. H. GODDARD,
G. L. GIBERSON.